Dec. 2, 1930.   S. J. FINN   1,783,232
WASHER LOADING DEVICE
Filed Jan. 10, 1927   2 Sheets-Sheet 1
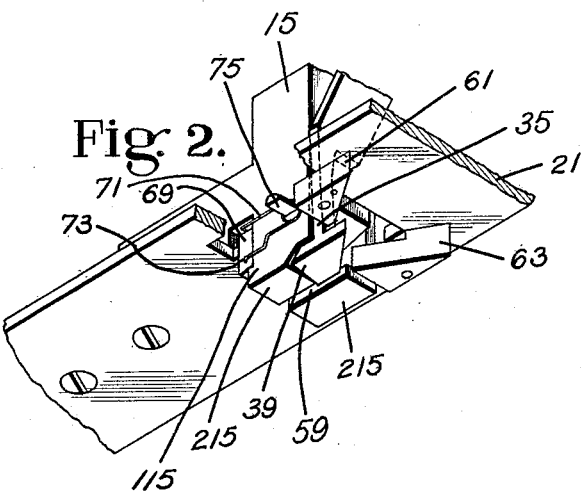
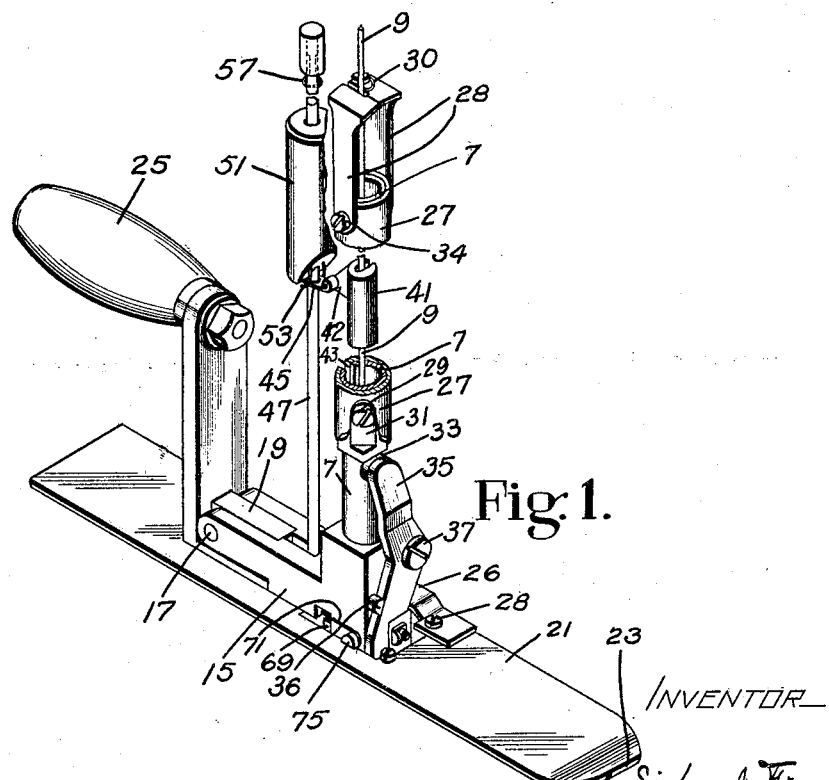
INVENTOR
Sidney J. Finn
By his Attorney,
Nelson M Howard Dec. 2, 1930.    S. J. FINN    1,783,232
WASHER LOADING DEVICE
Filed Jan. 10. 1927    2 Sheets-Sheet 2
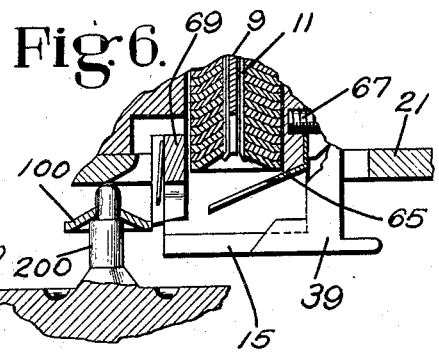
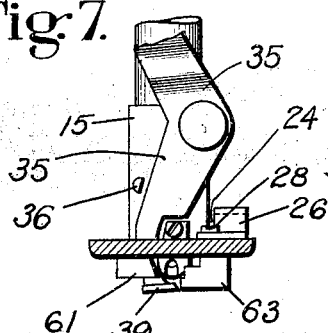
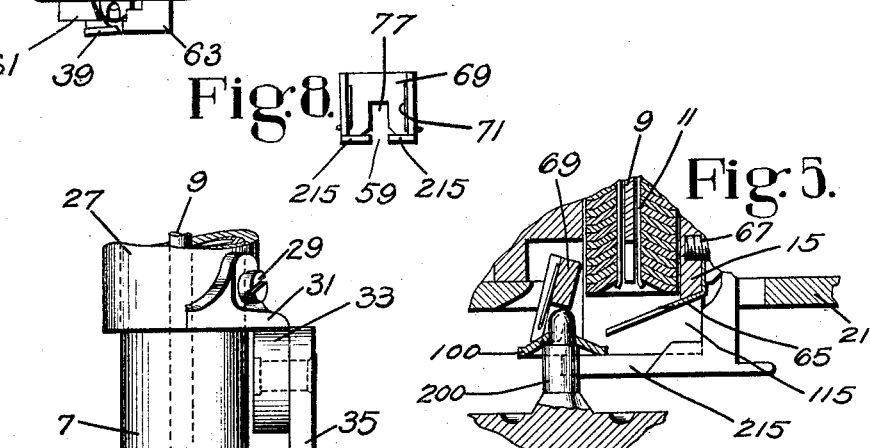
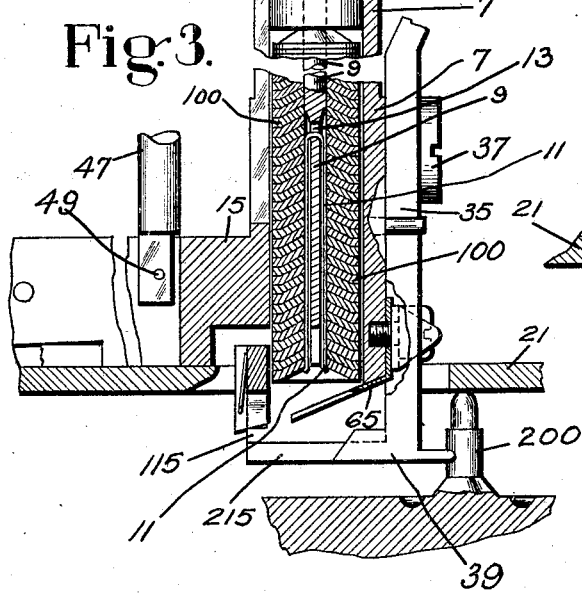
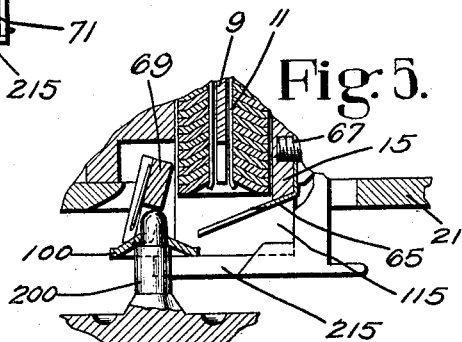
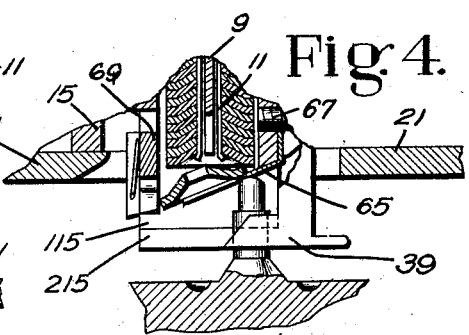
INVENTOR
Sidney J. Finn
By his Attorney
Nelson W. Howard Patented Dec. 2, 1930

1,783,232

UNITED STATES PATENT OFFICE

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY

WASHER-LOADING DEVICE

Application filed January 10, 1927. Serial No. 160,239.

This invention relates to placing perforated articles upon pins and is herein illustrated as embodied in a device for placing washers upon the pins of rubber heel molds.

Rubber heels commonly have imbedded in them a series of small washers, the holes through which register with the nail holes in the heel. These washers are commonly conical, the open sides thereof being faced toward the bottom of the heel so that the nails, when driven, will be guided into the nail holes. The molds in which rubber heels are molded and vulcanized comprise base plates having a plurality of upstanding pins, which form the holes in the finished heels. Upon these pins, the washers must be placed before the so-called "biscuits" of rubber are put into the molds; and the device of the present invention is adapted to perform this washer-placing operation.

Although in recent years various devices for this purpose have been designed, the great majority of heel washers are still placed by hand upon the mold pins. Unless a washer placing device will place a single washer upon each pin without dropping any considerable number of washers between the pins and without leaving any considerable number of pins unsupplied with washers it will not be satisfactory, since the time wasted by the operator in picking the dropped washers out of the mold, in removing one or more of a plurality of washers which have been placed upon a single pin, and in placing washers upon those pins which have been skipped will more than equal the time which should be gained over hand work by the use of the device.

The illustrated device is of the general type disclosed in Patent No. 1,584,477 granted May 11, 1926, upon an application filed in the name of Schrock, being in the form of a hand tool supporting a stack of washers, which tool is pushed and pulled forward and back over the mold after the manner of a carpenter's plane, and operates on its forward strokes to place washers upon the pins of the mold.

According to one feature of the present invention, the lowermost washer or similar article is displaced from the stack prior to being engaged by the mold pin by means movable axially of the stack and operable by engagement with a mold pin. In the illustrated construction the stack is maintained in a substantially vertical position for a purpose which later will be made apparent, and the lowermost washer is discharged from the stack upon a supporting plate which is considerably inclined to the horizontal so that, when presently the mold pin passes through a slot in the plate provided for that purpose, the washer will be engaged with certainty and threaded upon the pin. And since the washers are displaced one at a time from the stack, only one washer will be placed upon a given pin.

Another feature of the invention relates to improved means for displacing an end washer or similar article from a stack. In the illustrated device the stack of washers is threaded upon and suspended by a member having a flaring yielding end to engage the under face of the lowermost washer adjacent to the hole therein, means being provided for pulling the member up a distance substantially equal to the thickness of a washer whereby the flaring end of the suspending member is pulled through the lowermost washer, and, as it leaves the hole and springs back into place to engage the next-to-the-lowermost washer, snaps or shoots the lowermost washer from the stack with considerable force, overcoming any tendency of the lowermost washer to stick to the washer immediately above it.

These and other features of the invention including certain details of construction and combinations of parts will be described as embodied in an illustrative device and pointed out in the appended claims.

Referring now to the accompanying drawings,

Figure 1 is a perspective of a device in which the present invention is embodied, Figure 2 is a perspective of a portion of the bottom of the device, Figure 3 is a vertical longitudinal section through a portion of the device and a part of a mold showing the position of parts just as the mold pin is engaged by the washer-placing mechanism.

Figures 4, 5 and 6 are fragmentary sections showing three successive positions of the parts, Figure 7 is a view, principally in elevation, of a portion of the device, and Figure 8 is a rear elevation of the gate.

Referring first to Figures 1 and 3 to 6, the washers 100, herein shown as of the dished type, are suspended in nested relation in a tube 7, being threaded upon a rod 9 which carries at its lower flattened portion a forked member 11 of spring steel. This forked member is loosely carried by the rod, being hung by its U-shaped base upon the lower edge of a hole 13 formed in the flattened lower portion of the rod. The lower extremities of the arms of the forked member are slightly flared and engage the under side of the lowermost washer at localities adjacent to the hole in the washer. If now the stack of washers is held against upward movement and the rod 9 is pulled upward a distance equal to the thickness of a washer, the lowermost washer will be dropped from the stack, and the forked member will engage the under side of the next-to-the-lowermost washer. It has been stated above that the lowermost washer will be dropped from the stack. As a matter of fact, it will be shot or snapped from the stack with considerable force, sufficient to overcome any ordinary degree of adhesion between the lowermost washer and the washer immediately above it, such force being due apparently to the sudden spreading apart of the lower ends of the forked member after they have been moved toward each other by being drawn through the hole in the lowermost washer. Furthermore, the movement of the rod 9 takes place axially of the stack, and the lowermost washer is displaced axially with respect to the stack, thus directly removing the lowermost washer from any frictional retarding effect of the washer immediately above it. It will be noted that the forked member 11 is adapted to bear the weight of the remaining washers of the stack independently of the displaced washer and, therefore, serves to prevent the weight of the stack from bearing upon the displaced washer, leaving the latter free to be threaded upon a mold pin. The device, when being used, is pushed over the mold pins of a mold after the manner of a carpenter's plane; and each mold pin, as it is encountered, causes the rod 9 to be pulled upwardly and the lowermost washer of the stack to be held in position to be threaded upon and dragged away by the mold pin during further relative movement between the pin and the device. The general mode of operation of the device having been thus briefly explained, the details of its construction will now be described.

Referring first to Figure 1, the tube or magazine is integral at its lower end with a block 15, the rear end of which is forked and pivoted at 17 to a member 19 which is rigid with a shoe 21 having a slightly upturned forward end 23. The block and tube are permitted a slight rocking movement about the pivot 17, said movement being limited by a stop-pin 24 (Fig. 7) which is arranged to contact with the under side of a stop 26 in the form of a bent plate fastened by a screw 28 to the shoe 21. Rigid with the member 19 and the shoe 21 is a handle 25 which is grasped by the operator when the device is being pushed and pulled back and forth over successive rows of mold pins. Slidably mounted upon the upper portion of the magazine 7 is a sleeve 27 having fastened to its upper end by screws 34 two arms 28, the upper ends of which are bent inwardly. Fastened to the top of one of the inwardly bent portions of one of the arms 28 is one end of a catch in the form of a spring wire 30, the free portion of which extends into a groove (not shown) in one side of the rod 9. Thus, when the sleeve 27 is raised, the rod will be raised to discharge the lowermost washer of the stack in the manner which has been described. This sleeve has fastened to its lower end by a screw 29 a hardened block 31, the under surface of which is engaged by a roll 33 carried at the upper end of a bent lever 35 which is pivoted near its middle at 37, to the block 15. The lower end of this lever is formed with a foot 39 having an inclined face which contacts with a mold pin 200, when the device is being used, and is thereby swung outwardly about its pivot in a direction to cause the roll 33 to push up the hardened block 31, thereby pushing up the sleeve 27 and with it the arms 28 and rod 9. A stop 36 (Fig. 7) limits the outward swing of the lever 35.

When the rod 9 is thus pulled up, it is necessary to ensure that the stack of washers shall not rise with it. To this end (see Figure 1), a follower 41 rests upon the top of the stack and is so mounted that it is free to move down but cannot be moved up by upward pressure applied through the stack to its bottom. The follower is slotted, as shown, so as to be freely slidable upon the rod 9 and has rigid with it a thin arm 42 which extends out through alined slots 43 formed in the magazine 7 and sleeve 27. Pivoted to the outer end of this thin arm is one end of a small link 45, at the other end of which is a round hole slightly larger in diameter than that of an upright rod 47 which passes through the hole. The rod 47 is pivoted at 49 to the block 15 (Fig. 3), its lower end being flattened and extending into a slot in the block, the construction being such that the rod can rock about its pivot. Slidably mounted upon the rod 47 is a small weight 51. The lower end of this weight is formed with an inclined face into which are driven the two ends of a hanger 53 made of wire which extends underneath that end of the link 45 which is remote from the follower 41, the extreme end of the link, which is adjacent to the weight, extending under the bottom of the weight. With this construction the follower 41 will move down as the stack of washers decreases in height, but will not be moved up when the rod 9 is pulled up, because the edges of the hole in the small link 45 will engage the rod 47 on opposite sides thereof and prevent such upward movement. The follower 41 and its associated mechanism above described operate most effectively when the rods 47 and 9 are substantially vertical, and in the illustrated device the rods 47 and 9 are, therefore, so positioned with respect to the shoe 21. In order to permit the operator to lock the weight 51 to the top of the rod 47 when desired, for example when the magazine 7 is being filled with washers, a head 55, which is fast to the upper end of the rod, carries a friction catch 57 of spring wire of the form shown in Figure 1 so that, when the weight 51 is pushed up against the bottom of the head 55, the spring wire catch will enter the hole in the weight and hold the weight in raised position.

Referring now to the delivery end of the magazine 7 and more particularly to Figs. 2, and 3 to 6, the lower end of the stack of washers, which is suspended upon the rod 9, is just above the level of the bottom of the shoe 21. The block 15 has extending down through a rectangular opening in the shoe two flanges 115, having respectively integral with them, two horizontal plates 215; and between the adjacent edges of these plates is a narrow passageway 59 which extends across the extended axis of the washer-suspending rod 9 so that, when the device is pushed over the pins of a mold, the holes in the washers will be brought into proper position with respect to the pins upon which they are to be placed. In order to guide the moving device so that the pins will be caused to pass through the passageway 59, two guides 61, 63 (Fig. 2) having guiding faces which converge toward the passageway, are fastened to the under side of the shoe 21. The foot 39, which is part of the lever 35 has an inclined mold-pin-engaging face which extends nearly across the passageway 59. When, therefore, the device is pushed over the pins of a mold, and a pin is encountered by either of the guides 61, 63, the pin will pass through the passageway and, in doing so, will displace the foot 39 and thereby rock the lever 35 and pull the rod 9 up far enough to cause the lowermost washer to be discharged from the stack.

As has been explained, this washer is discharged with considerable force. In order to receive it temporarily before it is threaded on its mold pin, a thin, downwardly inclined slotted plate 65, fastened by a screw 67 to the block 15 extends beneath the stack of washers, and a yielding gate 69 cooperates with the plate to prevent the escape of the washer until the proper time. This gate, as best shown in Figure 2, is held in place against the rear edges of the downwardly extending flanges 115 of the block 15 by a spring 71. One end of this spring passes through a hole 73 in the side of the gate and is bent up on the inside of the gate as shown in Fig. 8. From the hole 73 the spring extends first forwardly around a pin 75, carried by the block 15, then rearwardly, then underneath a portion of the block 15 to the opposite side of the block. On this opposite side the spring extends forwardly around a pin (not shown) which is alined with the pin 75, then rearwardly through a hole in the side of the gate and then up along the inside of the gate. With this construction, the gate is normaly held in closed vertical position against the rear edges of the flanges 115 but may be swung open as indicated in Fig. 5. The gate (Fig. 8) has in it a vertical slot or opening 77 which is in line with the passageway 59 between the plates 215 so as to permit the upper portion of a mold pin to pass through it. It should be particularly noted that, as shown in Figure 4, when the lowermost washer has been discharged from the stack it is held in inclined position on the plate 65 so that the hole in it will receive the top of the mold pin upon further relative traverse between the device and the mold.

In the operation of the device a stack of washers is strung upon the rod 9, and the rod with the washers thereon lowered into the tube 7. During this placing of the washers in the tube, the arms 28 are swung down about the axes of the screws 34; and the rod 47, together with the follower 41 and weight 51, is swung away from the tube. The arms 28 are then swung back into the position shown in Figure 1 with the spring catch 30 engaging the horizontal groove in the rod. The rod 47 is swung toward the tube, and the follower 41 placed on the rod 9 with its bottom resting upon the top of the stack of washers. The operator then seizes the handle 19 and pushes the device across a rubber heel mold with the shoe 21 resting upon the tops of the mold pins. Such mold pins are commonly aranged in groups which are horseshoe-shaped in outline, but the operator can select a series of pins which are approximately in line and so guide the device that the pins of the series are received sucessively between the converging faces of the guides 61, 63. Figures 3 to 6 show four postions of the device in its forward movement with respect to a stationary mold pin 200. In Figure 3 a mold pin has just been engaged by the foot 39 which is about to be swung about its pivot 37 to cause the sleeve 27 and with it the rod 9 to be pulled up a distance equal approximately to the thickness of a washer. In Figure 4, this pulling up of the rod has been completed, and the lowermost washer of the stack has been discharged upon the inclined plate 65 but is prevented from sliding off from said plate by the gate 69. As the device continues its forward movement (to the right as shown in the figures) the washer is threaded on the pin and the gate opened as shown in Figure 5. Thereafter, as the device moves on, the washer remains on the mold pin, the gate closes and the parts of the device are in position to deposit a washer upon the next mold pin encountered.

Although the invention has been set forth as embodied in a particular device, it should be understood that the invention is not limited in the scope of its application to the particular device which has been shown and described.

In order to promote brevity as well as to point out a specific use of the device, the placing of washers upon the pins of a mold has been described and will be referred to generally throughout the claims but without intending to exclude other articles which may be placed upon members other than the pins of a heel mold.

The invention herein disclosed is claimed in one of its broader aspects in my copending application Serial No. 160,660, filed January 12, 1927.

Having thus described my invention, what I claim as new and desire to secure by Letters Patent of the United States is:

1. A device for placing washers upon the pins of a mold by relative traverse between the device and the mold, having in combination, a magazine for a stack of washers, and means movable axially of the stack and operated by a mold pin during said traverse for displacing the lowermost washer from the stack and moving it into position to be threaded upon the mold pin.

2. A device for placing dished washers upon the pins of a mold by relative traverse between the device and the mold, having in combination, a magazine for a stack of dished washers, a feed member for displacing the lowermost washer of the stack, and means responsive to said relative traverse for actuating the feed member in substantially the direction of the axes of the pins.

3. A device for placing washers upon the pins of a mold by relative traverse between the device and the mold, having in combination, a magazine for a stack of washers, a feed member movable axially of the stack for displacing the lowermost washer of the stack, and an actuator for said feed member adapted to be engaged and operated by a mold pin during said relative traverse.

4. A washer placing device adapted to be caused to travel over the pins of a mold, having in combination, a magazine for a stack of washers, and means movable axially of the stack and operated by a mold pin for displacing the lowermost washer from the stack and moving it into position to be threaded upon the mold pin.

5. A washer placing device adapted to be caused to travel over a mold pin, having in combination, a magazine for a stack of washers, a feed member operable upon movement axially of the stack to displace the lowermost washer and an actuator therefor located in position to be operated by engagement with the mold pin during said travel.

6. A device for placing washers upon the pins of a mold by relative traverse between the mold and the device, having in combination, a magazine for a stack of washers, a feed member movable axially of the magazine for moving a washer from its stacked position into position to be engaged by a mold pin, and an actuator for said feed member arranged to be operated by a mold pin during said relative traverse.

7. A device for placing washers upon the pins of a mold by relative traverse between the device and the mold, having in combination, a substantially flat shoe which rests upon the tops of the pins, a magazine for a stack of washers carried by said shoe, and means responsive to said relative traverse for causing the successive lowermost washers of the stack to be separated from the stack by movement axially of the stack and to be threaded successively upon successively encountered mold pins.

8. A device for placing washers upon the pins of a mold by relative traverse between the mold and the device, having in combination, a magazine for a stack of washers, means operated by a mold pin during said traverse for displacing the lowermost washer from the stack by a movement which is axial with respect to the stack, and means for holding the displaced washer in position to be threaded upon the mold pin.

9. A device for placing washers upon the pins of a mold by relative traverse between the mold and the device, having in combination, a substantially vertical magazine for a stack of washers, means operated by a mold pin during said traverse for displacing the lowermost washer from the stack, and tilting it into position to have its hole engaged by the mold pin, and means for holding the displaced washer in said position until it encounters the mold pin.

10. A device for placing washers upon the pins of a mold by relative traverse between the mold and the device, having in combination, a spring member upon which a stack of washers are threaded, said member having a flaring end to engage the under side of the lowermost washer, and means operated by a mold pin during such traverse for producing relative movement between the stack and the member to cause the flaring end of the member to move through the hole in said washer.

11. A device for placing washers upon the pins of a mold by relative traverse between the mold and the device, having in combination, a spring member upon which a stack of washers are threaded, said member having a flaring end to engage the under side of the lowermost washer, and means operated by a mold pin during such traverse for pulling said flaring end through the hole in the washer.

12. A device for placing washers upon the pin of a mold by movement between the mold and the device, having in combination, a magazine for a stack of washers, and means operated by a mold pin during such movement for shooting the lowermost washer from the stack in the direction of the extent of the axis of the stack.

13. A device for placing washers upon the pins of a mold by movement between the mold and the device, having in combination, a magazine for a stack of washers, means operated by a mold pin during such movement for shooting the lowermost washer from the stack in the direction of the extent of the axis of the stack, and means for holding said washer in position to be threaded upon the pin.

14. A device for placing washers upon the pins of a mold by a relative traverse between the mold and the device, having in combination, a magazine for a stack of washers, and means operated by a mold pin during such traverse for shooting the lowermost washer downwardly from the stack.

15. A device for placing washers upon the pins of a mold by relative traverse between the mold and the device, having in combination, a magazine for a stack of washers, means operated by a mold pin during such traverse for shooting the lowermost washer downwardly from the stack, and means for holding said washer in position to be threaded upon the pin.

16. A device for placing washers upon the pins of a mold by relative traverse between the mold and the device, having in combination, a rod upon which a stack of washers are threaded, a spring member carried by the rod and having a flaring lower end to engage the under side of the lowermost washer, and means operated by a mold pin during the traverse for pulling up the rod to cause the flaring end of the spring member to be pulled through the hole in the lowermost washer.

17. A device for placing washers upon the pins of a mold by relative traverse between the mold and the device having in combination, a rod upon which a stack of washers are threaded, a spring member carried by the rod and having a flaring lower end to engage the under side of the lowermost washer, means for preventing upward movement of the stack, and means operated by a mold pin during the traverse for pulling up the rod to cause the flaring end of the spring member to be pulled through the hole in the lowermost washer.

18. A device for placing washers upon the pins of a mold by relative traverse between the mold and the device, having in combination, a rod upon which a stack of washers are threaded, a spring member carried by the rod and having a flaring lower end to engage the under side of the lowermost washer, means operated by a mold pin during the traverse for pulling up the rod to cause the flaring end of the spring member to be pulled through the hole in the lowermost washer, and a follower resting upon the top of the stack to prevent upward movement of the stack.

19. A device for placing washers upon the pins of a mold by relative traverse between the mold and the device, having in combination, a magazine for a stack of washers, a rod threaded through the washer and having at its lower end a spring member for engaging the under side of the lowermost washer adjacent the hole therein, a member engaging the rod and slidable in a path parallel to the axis of the stack, and means operated by a mold pin during said relative traverse for lifting the member and with it the rod.

20. A device for placing washers upon the pins of a mold by relative traverse between the mold and the device, having in combination, a magazine for a stack of washers, a rod threaded through the washers and having at its lower end a spring member for engaging the under side of the lowermost washer adjacent the hole therein, a member engaging the rod and slidable in a path parallel to the axis of the stack, means operated by a mold pin during said relative traverse for lifting the member and with it the rod, and a follower for preventing upward movement of the stack.

21. A device for placing washers upon the pins of a mold by relative traverse between the mold and the device, having in combination, a magazine for a stack of washers, a rod threaded through the washers and having at its lower end a spring member for engaging the under side of the lowermost washer adjacent the hole therein, a member engaging the rod and slidable in a path parallel to the axis of the stack, means operated by a mold pin during said relative traverse for lifting the member and with it the rod, a follower resting upon the stack, a weight, and connections between the weight and the follower such that the follower is urged downward at all times but is held from upward movement.

22. A device for placing washers upon the pins of a mold by relative traverse between the mold and the device, having in combination, a rod upon which a stack of washers are threaded, a spring member carried by the rod and having a flaring end to engage the under side of the lowermost washer, means including a passageway for guiding a mold pin into position beneath the stack, and an actuator for the rod extending into the passageway in position to be moved by engagement with the pin to cause the rod to be pulled upward.

23. A device for placing washers upon the pins of a mold by relative traverse between the mold and the device, having in combination, a shoe adapted to rest upon the pins, a block carried by the shoe and having a portion projecting down through the shoe, said portion being provided with a passageway, a magazine for washers carried by the block and located with its axis above the passageway, means operated by a mold pin during said relative traverse for causing the lowermost washer to be moved downward axially from the stack, and an inclined plate arranged to receive the washer, said plate being slotted to permit the top of the mold pin to pass through it and engage the hole in the washer.

24. A device for placing washers upon the pins of a mold by relative traverse between the mold and the device, having in combination, a shoe adapted to rest upon the pins, a block carried by the shoe and having a portion projecting down through the shoe, said portion being provided with a passageway, a magazine for washers carried by the block and located with its axis above the passageway, means operated by a mold pin during said relative traverse for causing the lowermost washer to be moved downward from the stack, an inclined plate arranged to receive the washer, said plate being slotted to permit the top of the mold pin to pass through it and engage the hole in the washer, and a gate for engaging the edge of the washer prior to the engagement of the washer by the pin.

25. A device for delivering perforated articles comprising a member upon which the articles are threaded in stacked relation, said member having a flaring yielding end to engage that face of an end article which is remote from the stack, and means for producing relative movement between the member and the stack to cause the flaring end of the member to move through the hole in said end article into position to engage the next article of the stack.

26. A device for separating end washers successively from a stack of washers, having in combination, a member upon which the washers are threaded, yieldable means for holding the stack upon said member and means movable axially of the stack for overcoming said yieldable means to cause relative movement between the member and the stack.

27. A washer placing device adapted to be caused to travel over a mold pin having, in combination, a magazine for a stack of washers, a feed member movable axially of the magazine for displacing the lowermost washer, and an actuator therefor located in position to be operated by transverse engagement with the mold pin.

28. A device for placing washers successively upon the pins of a mold by relative traverse between the device and the mold, having, in combination, a magazine for a stack of washers, a feed member movable axially of the magazine for displacing the lowermost washer of the stack, and means responsive to said relative traverse for actuating the feed member once for each mold pin.

29. In a machine of the kind described, a column of washers adapted to be positioned on pins in a heel mold, and means automatically operable by said pins to impart a downward impulse to the lowermost washer to separate the lowermost washer from said column.

30. In a machine of the kind described, a column of washers adapted to be positioned on pins in a heel mold, and means automatically operable by said pins to feed the lowermost washer axially from said column.

31. In a machine of the kind described, a column of washers adapted to be positioned on pins in a heel mold, means automatically operable by said pins to separate and feed the lowermost washer axially from said column and position said washer for engagement by one of said pins, means to positively place said washer on said pin, and means to permit the feeding of washers of varying thicknesses.

32. A machine for delivering articles to devices, comprising a frame, a base on which said frame is mounted, said machine resting on and being guided by said devices, a column of washers carried by said machine, and means automatically operable to separate and feed the lowermost article axially from said column.

33. A device for placing washers upon the pins of a mold by relative traverse between the mold and the device having, in combination, a substantially vertical magazine for a stack of washers, means operable by a mold pin upon said relative traverse to separate the lowermost washer from the stack, and means for supporting the separated washer in a position of inclination to be engaged by a mold pin.

34. A device for placing washers upon the pins of a mold by relative traverse between the mold and the device having, in combination, a substantially vertical magazine for a stack of washers, means operable by a mold pin upon said relative traverse to separate the lowermost washer from the stack, and a supporting plate for the separated washer slotted to permit the passage of a mold pin and inclined to present the separated washer in a position to be engaged by and threaded upon the mold pin.

35. A device for placing washers upon the pins of a mold by relative traverse between the mold and the device having, in combination, a support for a stack of washers, and means operable by a mold pin and acting through said support for displacing the lowermost washer from the stack and moving it into position to be threaded upon the mold pin, said support being constructed and arranged to prevent the weight of the stack from bearing upon said displaced washer.

36. A device for placing washers upon the pins of a mold by relative traverse between the mold and the device having, in combination, a feed member constructed and arranged to support a stack of washers, and means operable by engagement with a mold pin to actuate said feed member to separate the lowermost washer from the stack, said feed member being adapted to bear the weight of the remaining washers independently of the separated washer.

In testimony whereof I have signed my name to this specification.

SIDNEY J. FINN.